(12) United States Patent
Monk

(10) Patent No.: US 9,058,602 B1
(45) Date of Patent: Jun. 16, 2015

(54) SOFTWARE EMULATION OF CONTACTLESS SMART CARD BEHAVIOUR WITHIN A PORTABLE CONTACTLESS READER DEVICE

(71) Applicant: Cubic Corporation, San Diego, CA (US)

(72) Inventor: Paul Monk, Surrey (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/566,601

(22) Filed: Dec. 10, 2014

Related U.S. Application Data

(60) Provisional application No. 61/914,248, filed on Dec. 10, 2013.

(51) Int. Cl.
*G06Q 20/32* (2012.01)

(52) U.S. Cl.
CPC .................................... *G06Q 20/322* (2013.01)

(58) Field of Classification Search
CPC ............. G06Q 20/322; G06Q 20/3278; H04L 29/08108; H04W 4/02; H04W 4/008; G07B 15/063; G07B 15/00; G07B 15/02
See application file for complete search history.

(56) References Cited

U.S. PATENT DOCUMENTS

| 7,331,522 | B2 | 2/2008 | Sandoval et al. | |
|---|---|---|---|---|
| 2003/0036355 | A1 | 2/2003 | Gundlack | |
| 2008/0201212 | A1* | 8/2008 | Hammad et al. | 705/13 |
| 2011/0137773 | A1* | 6/2011 | Davis et al. | 705/34 |
| 2011/0165866 | A1* | 7/2011 | Dixon et al. | 455/414.1 |
| 2014/0379391 | A1* | 12/2014 | Lulic et al. | 705/5 |

FOREIGN PATENT DOCUMENTS

| DE | 102010017861 A1 | 10/2011 |
|---|---|---|
| WO | 2006/000089 A1 | 1/2006 |
| WO | 2011/066327 A1 | 6/2011 |

OTHER PUBLICATIONS

ISR/WO mailed on Apr. 10, 2015 for International Patent Application No. PCT/US2014/069623 filed on Dec. 10, 2014, all pages.

* cited by examiner

*Primary Examiner* — Kristy A Haupt
(74) *Attorney, Agent, or Firm* — Kilpatrick Townsend & Stockton LLP

(57) ABSTRACT

A handheld transit fare device is provided. The transit fare device includes an NFC interface configured to send and receive data, a memory, and a processor. The processor is configured to receive, via the interface, a list of transactions from a host device using standard smart card protocol commands and reply structures. The list of transactions includes identifiers of fare access media used to gain access to a transit vehicle. The processor is configured to store the list of transactions on the memory and to provide a first indication that the list of transactions has been received. The processor is configured to receive, via the interface, an identifier from a fare access media on the transit vehicle, determine whether the identifier from the fare access media matches one of the identifiers from the list of transactions, and provide a second indication that provides a result of the determination.

19 Claims, 6 Drawing Sheets

SOFTWARE EMULATION OF CONTACTLESS SMART CARD BEHAVIOUR WITHIN A PORTABLE CONTACTLESS READER DEVICE

CROSS-REFERENCES TO RELATED APPLICATIONS

This nonprovisional application claims priority from U.S. Provisional Application No. 61/914,248, filed on Dec. 10, 2013, the complete disclosure of which is herein incorporated by reference.

BACKGROUND OF THE INVENTION

Fare collection systems used in transit systems often involve handheld fare devices that interrogate transit fare media to determine the usage history and status of that media. Where such information cannot be stored on the fare media then conventional handheld devices often require constant communication within a backend or remote server to process information to determine this status. This causes delays in processes requiring such data transmissions.

BRIEF SUMMARY OF THE INVENTION

In one aspect, a handheld transit fare device is provided. The transit fare device may include a near field communication (NFC) interface configured to send and receive data, a memory, and a processor. The processor may be configured to receive, via the NFC interface of the handheld transit fare device, a list of transactions from a host device. The list of transactions may include a plurality of identifiers of a plurality of fare access media used to gain access to a transit vehicle. The processor may also be configured to store the list of transactions on the memory and to provide a first indication that the list of transactions has been received. The processor may be further configured to receive, via the NFC interface of the handheld transit fare device, an identifier from a fare access media on the transit vehicle, to determine whether the identifier from the fare access media matches one of the plurality of identifiers from the list of transactions, and to provide a second indication. The second indication may provide a result of the determination.

In another aspect, a method for emulating a smartcard on a handheld transit fare device is provided. The method may include receiving, via a near field communication (NFC) interface of the handheld transit fare device, a list of transactions from a host device. The information may be exchanged in the form of standard smart card message command and reply formats. The list of transactions may include a plurality of identifiers of a plurality of fare access media used to gain access to a transit vehicle. The method may also include storing the list of transactions on a memory of the handheld transit fare device and providing a first indication that the list of transactions has been received. The method may further include receiving, via the NFC interface of the handheld transit fare device, an identifier from a fare access media on the transit vehicle. The method may include determining whether the identifier from the fare access media matches one of the plurality of identifiers from the list of transactions and providing a second indication. The second indication may provide a result of the determination.

In another aspect, a non-transitory computer-readable medium having instructions embedded thereon for emulating a smartcard on a handheld transit fare device is provided. The instructions may include computer code for causing a computing device to receive, via a near field communication (NFC) interface of the handheld transit fare device, a list of transactions from a host device. The list of transactions may include a plurality of identifiers of a plurality of fare access media used to gain access to a transit vehicle. The instructions may also include computer code for causing the computing device to store the list of transactions on a memory of the handheld transit fare device and to provide a first indication that the list of transactions has been received. The instructions may further include computer code for causing the computing device to receive, via the NFC interface of the handheld transit fare device, an identifier from a fare access media on the transit vehicle, to determine whether the identifier from the fare access media matches one of the plurality of identifiers from the list of transactions, and to provide a second indication. The second indication may provide a result of the determination.

In another aspect, a method for emulating a smartcard on a handheld transit fare device is provided. The method may include receiving, via a near field communication (NFC) interface of the handheld transit fare device, data or instructions from a host device. The information shall be exchanged in the form of standard smart card message command and reply formats. The method may further include displaying, storing, communicating or otherwise processing the information received via the NFC interface of the handheld transit fare device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
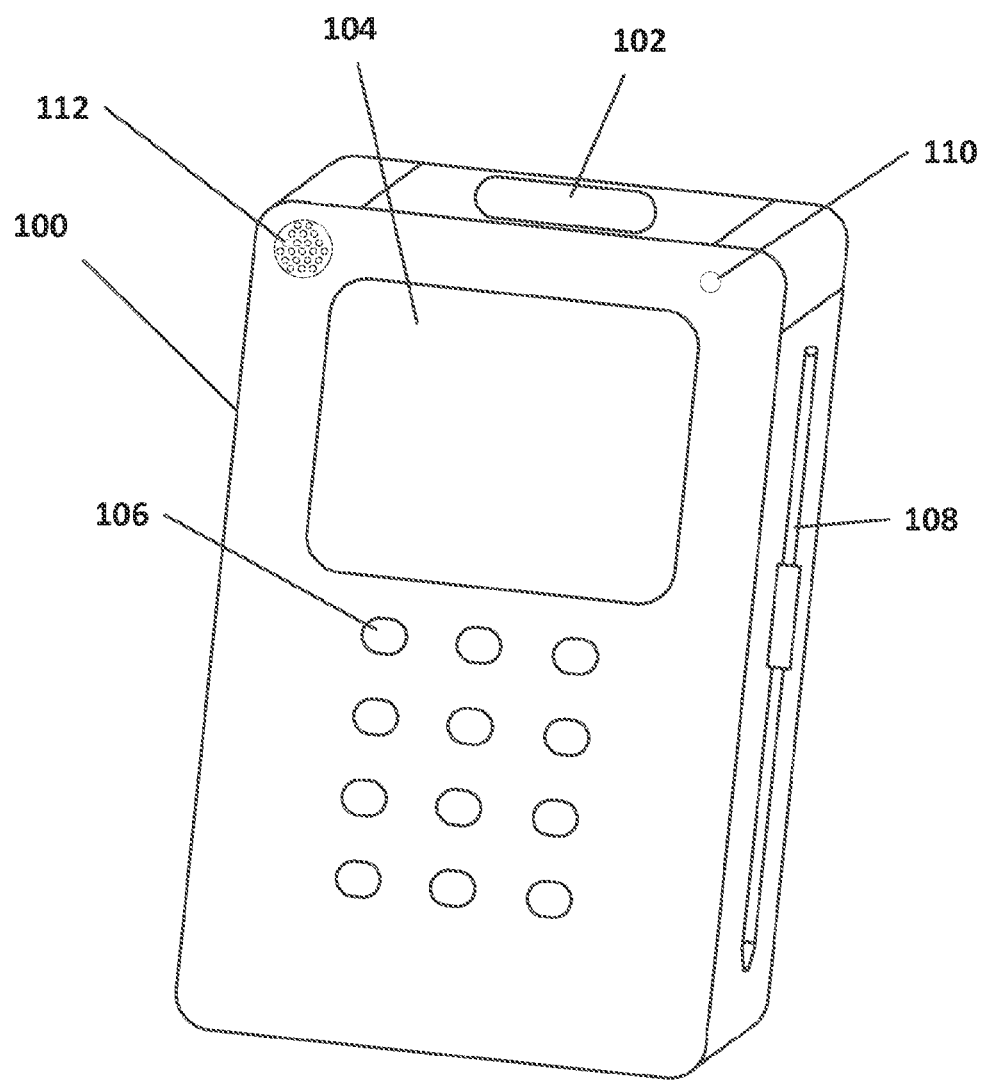
FIG. 1 depicts a handheld transit fare device according to embodiments.

For the purposes of explanation, the ensuing description provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the invention provide systems and methods for utilizing standard smartcard message command and reply protocols to emulate a smartcard using a handheld transit fare device. Such systems and methods utilize existing near field communication (NFC) infrastructure to send and receive data in real-time, such as information associated with fare media used to access a transit system. NFC enables instant feedback as to the function of a connected device, whereas other communication methods may merely indicate that a connected device is online and/or connected. Software utilizing NFC standards, such as International Organization for Standardization (ISO) 14443, may be used to create a peer-to-peer connection that enables data transfer from a host device to a mobile device over the air using NFC connections. The software may also govern the format of the message to ensure that they are communicable via the NFC connections. The emulation utilizes the antennae and processors of existing NFC-enabled devices.

In one embodiment, a handheld transit fare device is provided. This fare device may be used by a fare inspector to quickly scan fare media using NFC protocol. The fare devices may download data related to transit fare media used to enter a transit system, and the fare devices may then be used to scan the media on a transit vehicle. The fare devices may locally compare data from the scans with the downloaded data to determine whether the transit media was used to enter the transit system or vehicle in real-time. Conventional fare systems that are unable to determine the usage history from the fare media do not include this capability and instead must communicate the scanned data to a remote server to assist in making the determination. This could result in a significantly slower system. While primarily discussed herein as a transit device, devices emulating smart cards for the purpose of supporting data transfers may be used in any number of non-smart card applications. For example, NFC devices utilizing software to communicate data transfers using smart card protocols may be used in banking applications that involve transferring payment information, transaction information, and/or other financial data using smart card protocols. Such data transfers may also be used to allow an NFC device to be used as a login device for a computer and/or a secured access facility or other secured access area. The NFC device may be presented to an entry device and communicate any login credentials using a smart card protocol.

Referring now to FIG. 1, one embodiment of an NFC device or handheld transit fare device 100 is shown. Handheld transit fare device 100 may include an NFC reader 102. NFC reader 102 may be configured to operate in accordance with ISO 14443 and/or other NFC protocols. The handheld transit fare device 100 may include software that enables the NFC reader 102 to operate as a transceiver for communicating with devices and smart cards using NFC connections. The handheld transit fare device 100 may further include a display screen 104 that may provide text and/or images to help a user. For example, the NFC reader 102 may be used to scan a fare access media, such as a smart card, mobile device, a bank card, and/or other NFC-enabled device. The handheld transit fare device 100 can determine whether the fare access media had been used to board the transit vehicle, and a result of this determine may be displayed on screen 104. In some embodiments, display screen 104 may be a touchscreen that enables a user to interact with the handheld transit fare device 100 using the display screen 104. The handheld transit fare device 100 may also include other input devices. For example, a keypad 106 may be included for a user to interact with the handheld transit fare device 100. A stylus 108 may also be included to help a user interact with display screen 104. The handheld transit fare device 100 may provide audio and/or visual indications to alert a user of various actions. For example, an indication may be provided based on a result of the determination, or an indication may be provided showing a communication has occurred, such as a communication between the handheld transit fare device 100 and a fare access media, host computer, or other device. A visual indication may be provided using the display screen 104 and/or using a light emitting device, such as light emitting diode (LED) 110. LED 110 may light up using patterns and/or colors that indicate whether an action has occurred and/or a result of an action. In some embodiments, handheld transit fare device 100 may also include a speaker 112 that is configured to produce an audible signal to indicate an action or result of an action to a user. The audible signal may include beeps, prerecorded speech, and/or other sounds.

Figure 2:
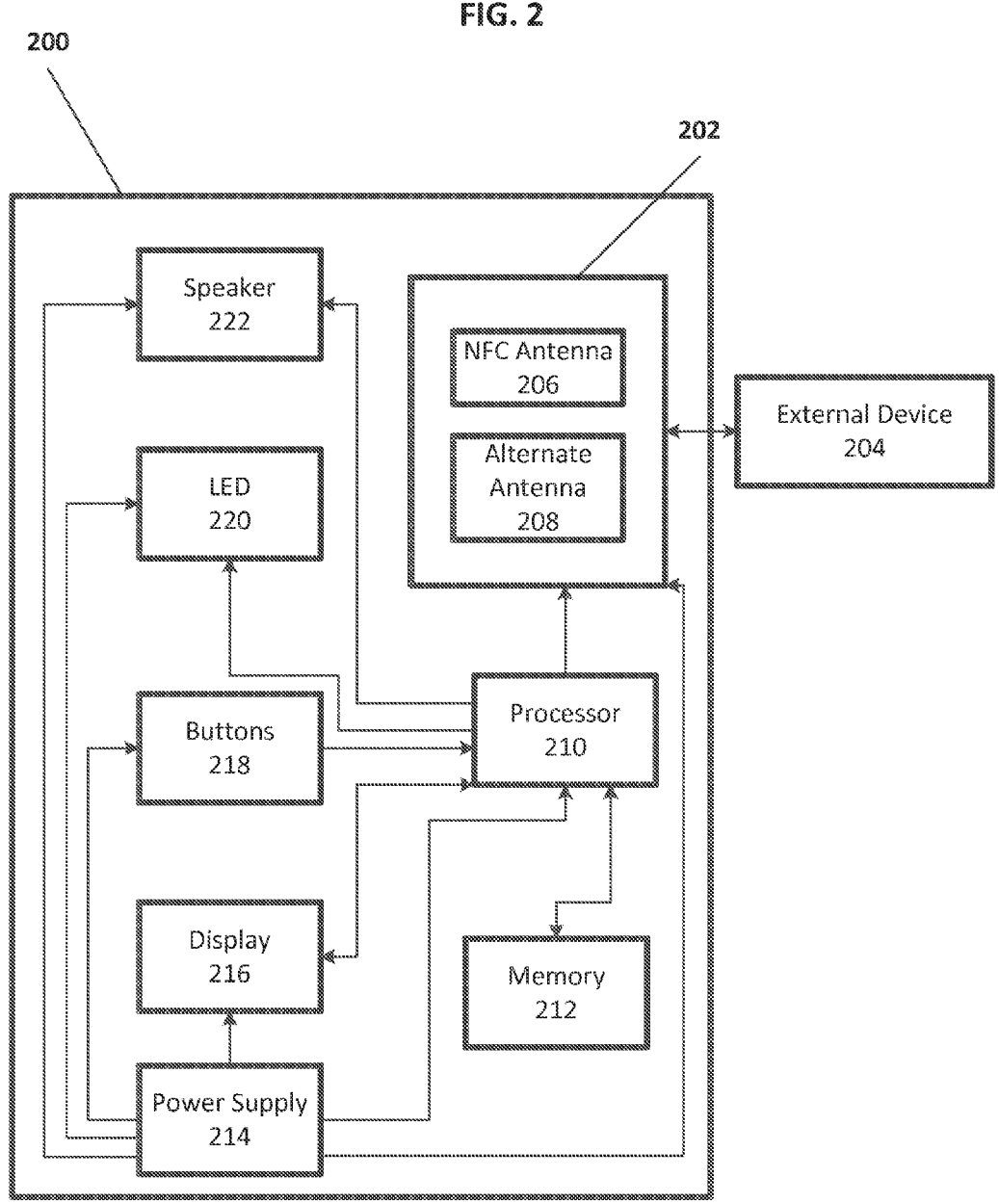
FIG. 2 depicts a block diagram of a handheld transit fare device configured for smartcard emulation with an external device according to embodiments.

FIG. 2 depicts a block diagram of an NFC device or handheld transit fare device 200 configured for communicating with an external device 204 utilizing smart card message protocols, according to one embodiment. Handheld transit fare device 200 may be the handheld transit fare device 100 described herein. External devices 204 may include smart cards, mobile devices, computers, servers, and/or other wireless and/or NFC-enabled devices. Handheld transit fare device 200 may include a transceiver 202 having an NFC antenna 206 that is configured to send and receive data using NFC protocol. For example, the NFC antenna 206 may produce an electric and/or magnetic field that may be modulated by another NFC-enabled device to communicate information to the handheld transit fare device 200. The NFC antenna 206 may also be able to modulate a signal produced by external device 204, such as a host computer, to communicate. In some embodiments, the NFC antenna 206 may be configured to emit a continuous field or modulate a field at all times while powered, while in other embodiments, the NFC antenna 206 may only emit a field and/or modulate when a user enables a scan mode on the handheld transit fare device 200, such as by using an input device to interact with the handheld transit fare device 200. The transceiver may also include one or more alternate antennae 208. For example, a cellular, Wi-Fi, Bluetooth, radio, and/or other antenna may be included to enable communication outside of the NFC antenna 206. Such communication may be particularly useful when communicating with a system or device located outside a communication range of the NFC connection, often less than 10 cm. Additionally, the presence of one or more alternate antennae allows the handheld transit fare device 200 to communicate with devices that are not NFC-enabled.

The handheld transit fare device 200 may include one or more processors 210 configured to control the functionality of the various components of the handheld transit fare device 200, as well as to process any data received using the transceiver 202. The processors 210 may determine a format and style of message or other information to transmit and/or receive using the correct communications protocol based on the external device 204, the signal received, based on any software controlling the processor 210, and/or the contents of the signal. Information received using transceiver 202 may be demodulated or otherwise translated into a readable format by the processor 210. The handheld transit fare device 200 may include a memory 212 that may store information received from the external device 204. For example, lists of information received from a central server or host computer, such as identifiers from a fare access media, may be stored in the memory 212. Other types of information may be stored on memory 212 depending on the particular application of the handheld transit fare device 200. The memory 212 may also be configured to store software that directs the processor to perform various functions.

The handheld transit fare device 200 includes a power supply 214 that may include a battery, as well as voltage regulatory circuits to supply components of the handheld transit fare device 200 with an appropriate voltage and current for operation. A user may interact with the handheld transit fare device 200 in a variety of ways. For example, a display screen 216 may provide a visual indication to the user. The indication may show the status of the handheld transit fare device 200, such as whether the handheld transit fare device 200 is in a scan mode. The indication may also alert a user whether information has been received from external device 204. The display 216 may also produce a readable display of information received. Display 216 may be configured to produce any images, information, and/or indications. In some embodiments, the display 216 may be a touchscreen display that enables a user to interact with the handheld transit fare device 200 by touch. Other inputs may be included on the handheld transit fare device 200 in some embodiments. For example, the handheld transit fare device 200 may include one or more buttons 218, such as on a keypad, that enable users to interact with the handheld transit fare device 200.

The handheld transit fare device 200 may also have additional hardware to provide indications to a user. For example, the handheld transit fare device 200 may include a light emitting device, such as LED 220 to provide a visual indication to a user. LED 220 may be controlled by processor 210 and be configured to emit a light of a particular color and/or intensity. LED 220 may also flash one or more times to indicate various functions of the handheld transit fare device 200. As one example, LED 220 may light up green if an identifier from a scanned fare access media matches an identifier on a list of identifiers of fare access media used to gain access to a transit system. Such a list may be received from a host computer at the transit system and/or on a transit vehicle, or the list may be received from a central server located remotely from the handheld transit fare device 200. The handheld transit fare device 200 may also include a speaker 222 that is configured to provide audible indication to a user. For example, pre-recorded speech, text-to-speech, polyphonic tones, and or other audio signals may be emitted using speaker 222. It will be appreciated that handheld transit fare device 200 as described is just one embodiment of a handheld transit fare device. Other embodiments may include variations of fare devices that combine, separate, add, and/or omit various features and/or components of the handheld transit fare devices described herein.

Figure 3:
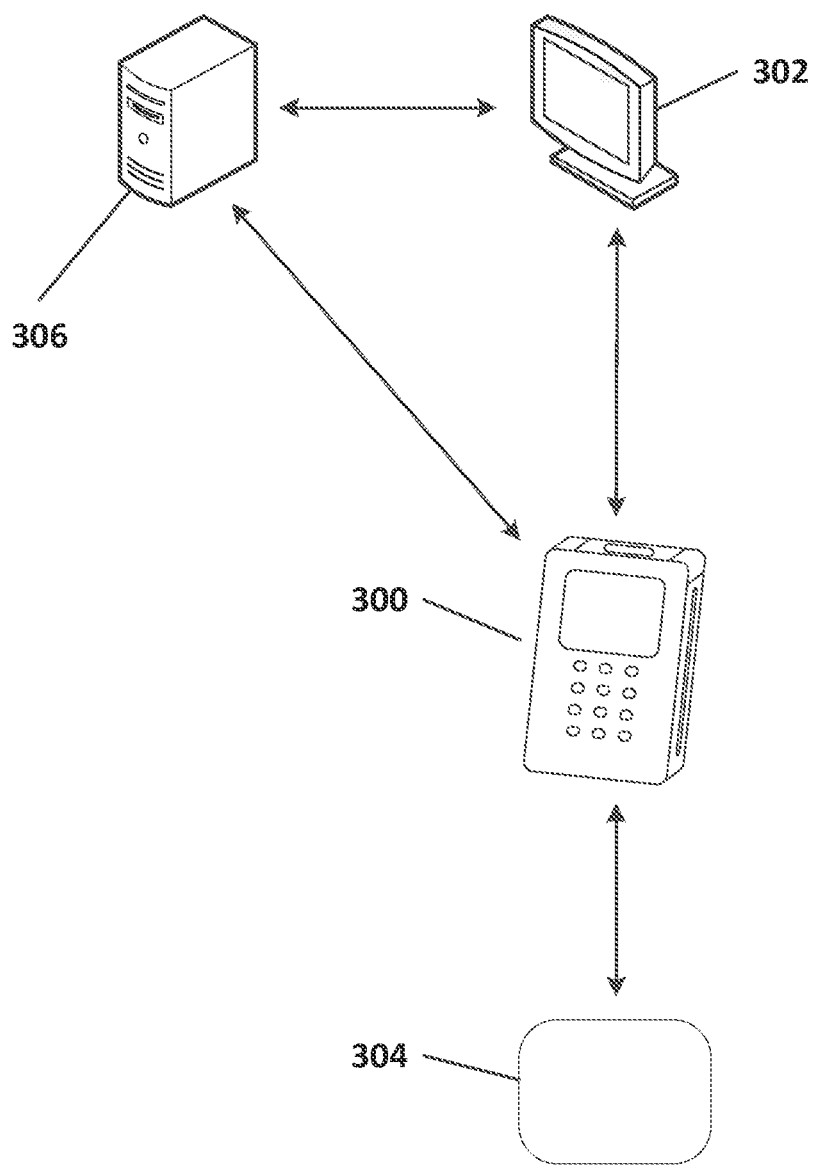
FIG. 3 is a system diagram showing interconnectivity of a portable NFC device 300 with other devices and systems according to embodiments.

FIG. 3 is a system diagram showing interconnectivity of a portable NFC device 300 with other devices and systems. NFC device 300 may be the handheld transit fare device 100 and 200 described above, or may be an NFC device used in an application outside of a transit system. NFC device 300 may be configured to interact with both NFC-enabled devices and those using different communication protocols, such as Wi-Fi, cellular, and/or Bluetooth connectivity. For example, NFC device 300 may communicate with a host computer or system 302 using one or more of the communication protocols. In some embodiments, the host computer 302 may have a master-slave set up with the handheld transit fare device 300 such that the host device produces an NFC signal or field and detects when a device, such as the handheld transit fare device 300, is in range and modulates the signal or field to communicate information. This modulation is emulating how a smart card would interact with the host computer 302.

In some embodiments, information may be communicated with a remote server 306. If NFC device 300 includes one or more alternate communication protocols and/or antennae, the NFC device 300 may communicate with the remote server 306 directly. For example, NFC device 300 may communicate over a public or private wireless network to send and/or receive data from the central server. Such data may include bank card information, transit fare information, login data, other access data, and/or any other information used in data transfers and/or transactions. In other embodiments, the host computer 302 may relay information from the NFC device 300 to the remote server 306. The host computer 302 may transmit all or a portion of data received from the NFC device 300 to the remote server 308. The host computer 302 may also transmit all or a portion of data received from the remote server 306 to the NFC device 300. In some embodiments, the remote server 306 is a cloud server accessible using a public and/or private network.

The NFC device 300 may also communicate with other portable NFC-enabled devices. For example, NFC device 300 may communicate with a smart card 304. The NFC device 300 may read data from the smart card 304, transmit data to the smart card 304, and/or write data onto the smart card 304. The NFC device 300 emits an electric and/or magnetic field that is modulated by the presence of the smart card 304 or other NFC-enabled device. The modulated signal is demodulated such that the data may be processed, stored, and/or transmitted to another device or system.

Figure 4:
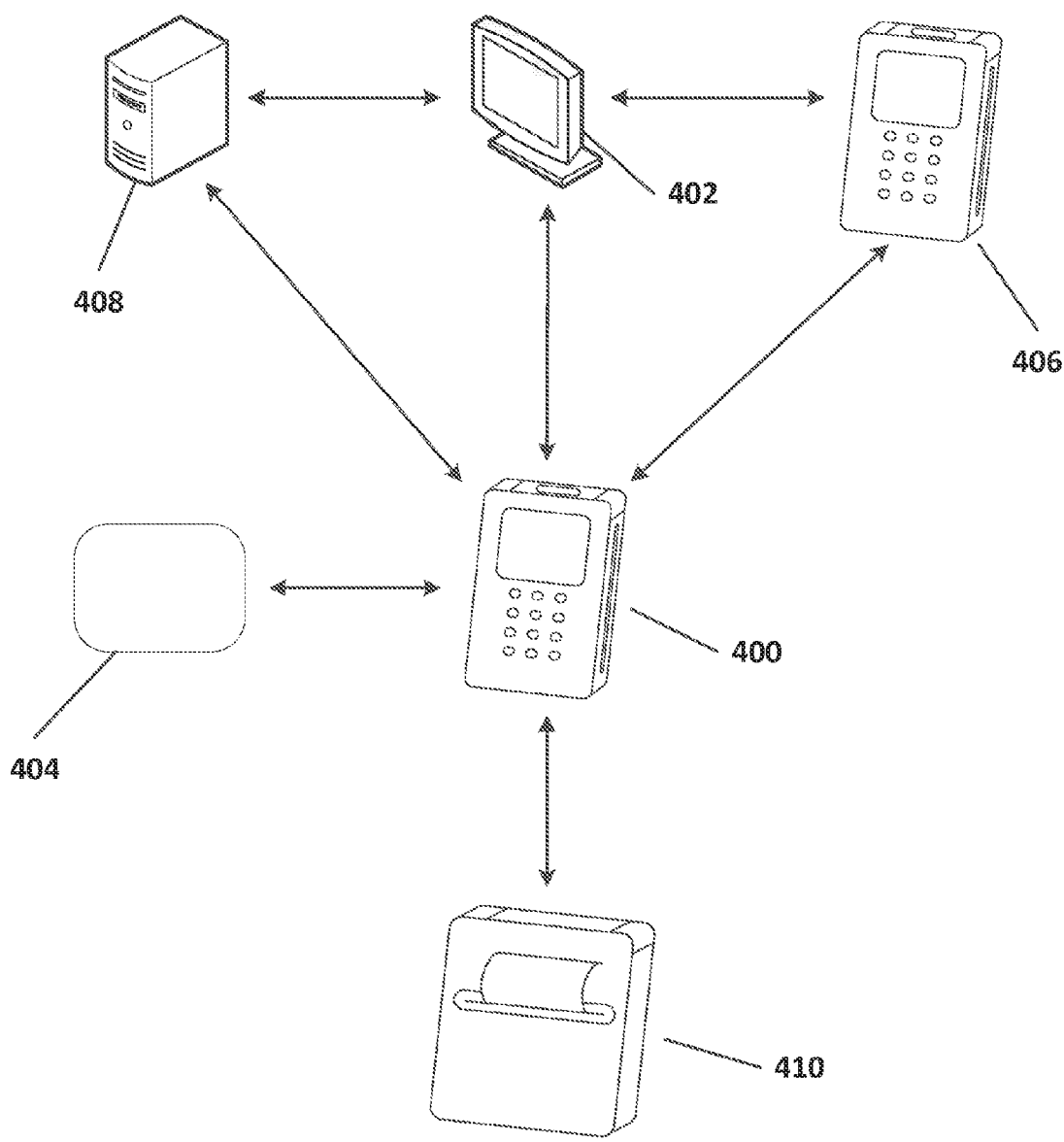
FIG. 4 depicts a system diagram showing interconnectivity of a handheld transit fare device within a transit system according to embodiments.

FIG. 4 depicts a system diagram showing interconnectivity of an NFC device or handheld transit fare device 400 within a transit system. In some embodiments, handheld transit fare device 400 may be the handheld transit fare device 100 or 200, or NFC device 300 described herein. The handheld transit fare device 400 may communicate with a host computer 402, such as by using an NFC connection and/or other wireless connection. In some embodiments, the host computer 402 may be located on a transit vehicle, such as a bus or train. The host computer 402 may transmit information, such as ridership information, to the handheld transit fare device 400. For example, the host computer 402 may receive information about what fare access media were used to gain access to the transit system and/or the transit vehicle. The host computer 402 may receive this data from a transit gate (not shown), a central or remote server 408, through manual entry, and/or other sources. In some embodiments, the portable fare device 400 may receive the information, such as the list of identifiers, from the remote server 408 using a wireless network connection. The information may include a list of identifiers of a number of fare access media that were used to gain access to the transit system and/or vehicle. The information may be provided based on a relevant timeframe, such as the last hour or day, to reduce the amount of information downloaded onto the handheld transit fare device 400.

The handheld transit fare device 400 may be brought within an NFC communication range and may receive data, which may include the list of identifiers, from the host computer 402. In some embodiments, the handheld transit fare device 400 may produce an indication that the connection and/or data transfer was successful using a display, speaker, and/or light emitting device as described herein. The handheld transit fare device 400 may then scan a fare access media 404 to receive information from the fare access media 404. The fare access media 404 may include a smart card, mobile phone, other mobile device, and/or other NFC-enabled devices. The information received from the fare access media 404 may include an identifier of the fare access media 404. The information may also include an expiration date of the fare access media 404, a number of rides remaining on the fare access media 404, a remaining balance of the fare access media 404, and/or other data. This information may be communicated to one or more other devices or systems. For example, the information received may be transmitted to one or more other fare devices 406, to the host computer 402, and/or a remote server 408.

As one example, the information may be transmitted to the host computer 402 such that the host computer 402 may determine whether information, such as the identifier received from the fare access media 404, matches information on the list of identifiers to determine whether the rider used the fare access media 404 or whether fraudulent activity took place. In some embodiments, the handheld transit fare device 400 may be able to make this determination by comparing the list received from the host computer 402 with the identifier received from the fare access media 404. This determination may be done in real-time to help a fare inspector efficiently check the fare access media of some or all passengers. This provides a substantial improvement over conventional fare devices that scan a fare access media, transmit information from the media to a remote server, and receive a determination of the usage of the fare access media that was processed by the remote server. By removing the need to send and receive data from the remote server after each scan, handheld transit fare device 400 provides a more efficient device for checking fare access media usage. In some embodiments, an audio and/or visual indication may be provided by the handheld transit fare device 400 alerting the fare inspector as to the result of the determination.

As another example, the information received from a fare access media 404 may be transmitted to another fare device 406. Several fare inspectors may be used to scan fare access media at once on a single transit vehicle. Each fare device 406 and/or handheld transit fare device 400 may receive the list of identifiers. Each fare device 406 and/or handheld transit fare device 400 receives identifiers from scanned fare access media 404. These identifiers may be transmitted amongst the fare devices 406 and/or handheld transit fare devices 400. Each fare device 406 and/or handheld transit fare device 400 may compare all of the identifiers received from the fare access media 404 to the list received from the host computer 402 to determine whether a desired portion or all of the fare access media 404 used to access the transit system and/or vehicle have been scanned. In some embodiments, the fare devices 406 and/or handheld transit fare devices 400 utilize the NFC connection, while in other embodiments, alternative wireless networks are used for communication.

As another example, information may be transmitted to a remote server 408. In some embodiments, fare access media 404 may have a limited number of uses, an expiration date, a stored dollar value, and/or may be another type of limited use fare access media. In such cases, the identifier received from the fare access media 404, as well as additional information related to the fare access media 404, may be transmitted from the handheld transit fare devices 400 to the remote server 408. The remote server 408 may then store and/or update a record of the transit media such that an accurate balance of rides and/or stored value may be maintained. In some embodiments, this transfer of data from the handheld transit fare devices 400 to the remote server 408 may be done in real-time to help prevent subsequent use of a fare access media 404 that has no value and/or rides remaining. This is especially useful if a passenger did not use a fare access media 404 to enter the transit system and/or vehicle, such as by fraud or other reasons. In other embodiments, the identifiers and/or other information may be stored on the handheld transit fare devices 400 and transmitted as one or more batches of information.

In some embodiments, the handheld transit fare devices 400 may cause a receipt and/or a citation to be printed. For example, if it is determined that the received identifier is not on the list of identifiers, the handheld transit fare devices 400 may have a citation or warning printed to issue to the offending passenger. In some embodiments, the printer may be part of the host computer 402 or the handheld transit fare devices 400. In other embodiments, a portable printer 410 may be used. The portable printer 410 may communicate with the handheld transit fare devices 400 using an NFC or other data connection. In some embodiments, the printer 410 may send information back to the handheld transit fare devices 400, such as a confirmation of successful printing or an indication of a printer error. Such indication may be presented to a user by a display screen, LED, speaker, and/or other device capable of producing audio, visual, and/or vibrational indications.

Figure 5:
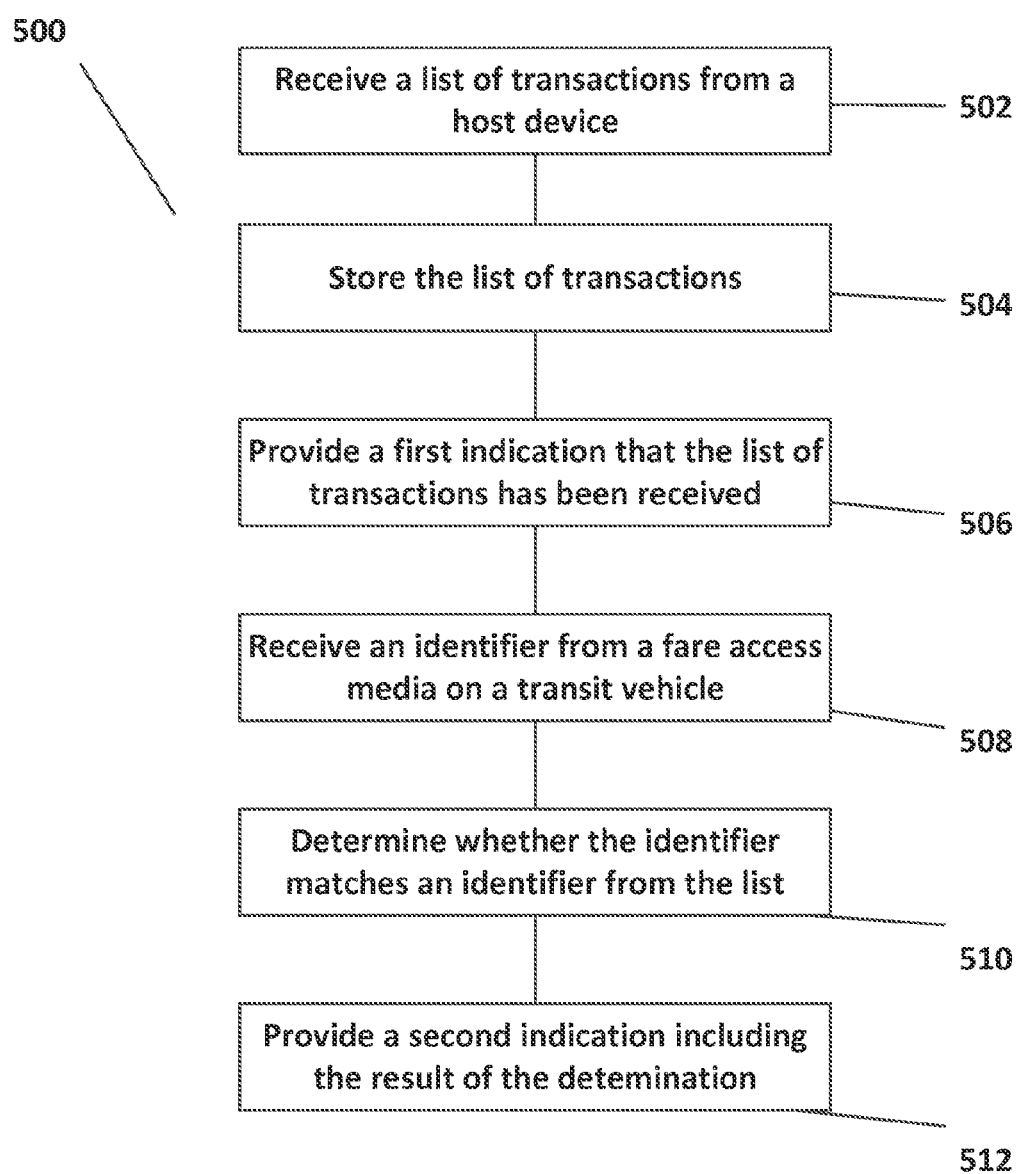
FIG. 5 is a flow chart depicting a method for emulating a smartcard on a handheld transit fare device according to embodiments.

FIG. 5 is a flow chart depicting a method 500 for emulating a smartcard on a handheld transit fare device is provided. Some or all of the functionality depicted in the blocks of the method 500 may be performed by an NFC device, such as the handheld transit fare device 100 of FIG. 1, the handheld transit fare device 200 of FIG. 2, the NFC device 300 of FIG. 3, and/or the handheld transit fare device 400 of FIG. 4, respectively. The method may include receiving, via a near field communication (NFC) interface of the handheld transit fare device, a list of transactions from a host device at block 502. In such cases the list will be transmitted using standard smart-card message protocols for command and reply exchanges. The list of transactions may include a plurality of identifiers of a plurality of fare access media used to gain access to a transit vehicle. In some embodiments, the host device is located on a transit vehicle. At block 504, the method may also include storing the list of transactions on a memory of the handheld transit fare device. A first indication that the list of transactions has been received may be provided at block 506. The method may further include receiving, via the NFC interface of the handheld transit fare device, an identifier from a fare access media on the transit vehicle at block 508. The method may include determining whether the identifier from the fare access media matches one of the plurality of identifiers from the list of transactions at block 510. A second indication may be provided at block 512. In some embodiments, the second indication provides a result of the determination. In some embodiments, the first indication and/or the second indication include an audio indication and/or a visual indication. For example, a speaker of the handheld transit fare device may be used to produce an audio indication. A display screen and/or light emitting device of the handheld transit fare device may be used to produce a visual indication. A visual indication could be a color or pattern of lights and/or a text or image produced on the display screen.

In some embodiments, the method may include communicating information to a second handheld transit fare device and/or the host device using the NFC interface. The information may include the result of the determination, such as whether the media was used, a stored value, a number of remaining rides, an expiration date, and/or other information related to the determination and/or fare access media. In some embodiments, the fare access media may have a limited number of uses. The method may then include communicating a third indication that the fare access media was used to gain access to the transit vehicle to a central server using Wi-Fi or a cellular communication network. The central server may then use this information to deduct one ride from the fare access media and/or a transit account associated with the fare access media. In this manner, the transit system may update the number of uses available for the fare access media in real-time, reducing the likelihood of fraudulent activity. For example, real-time updates prevent a user of a limited-use fare access media having a single ride remaining from using the fare access media twice in a short span. Without real-time updates, short term multiple rides may allow a user to utilize the fare access media multiple times before the handheld device communicates with the central server to update the ride count.

In some embodiments, the method may further include causing a receipt or citation to be printed based on the result of the determination. For example, if the determination is that the fare access media was not used by a rider to access the transit system and/or vehicle, a citation may be printed. A receipt may be printed based on a determination that the user did you the fare access media to access the transit system and/or vehicle. In some embodiments, a receipt may show how many rides are left on a limited-use fare access media, show an expiration date of a fare access media, and/or show remaining funds on a stored value fare access media. In some embodiments, the ticket and/or receipt may be printed using a printer of the handheld transit fare device. In other embodiments, the printer may be an external printer, such as a printer of the transit vehicle or a separate portable printing device. It will be appreciated that method 500 as described is just one embodiment of a method for emulating a smartcard on a handheld transit fare device. Other embodiments may include variations to the method that combine, separate, add, and/or omit various features and/or blocks described herein. Embodiments may also perform blocks simultaneously and/or in a different order, or otherwise utilize different operations to perform a similar method for emulating a smartcard on a handheld device.

Figure 6:
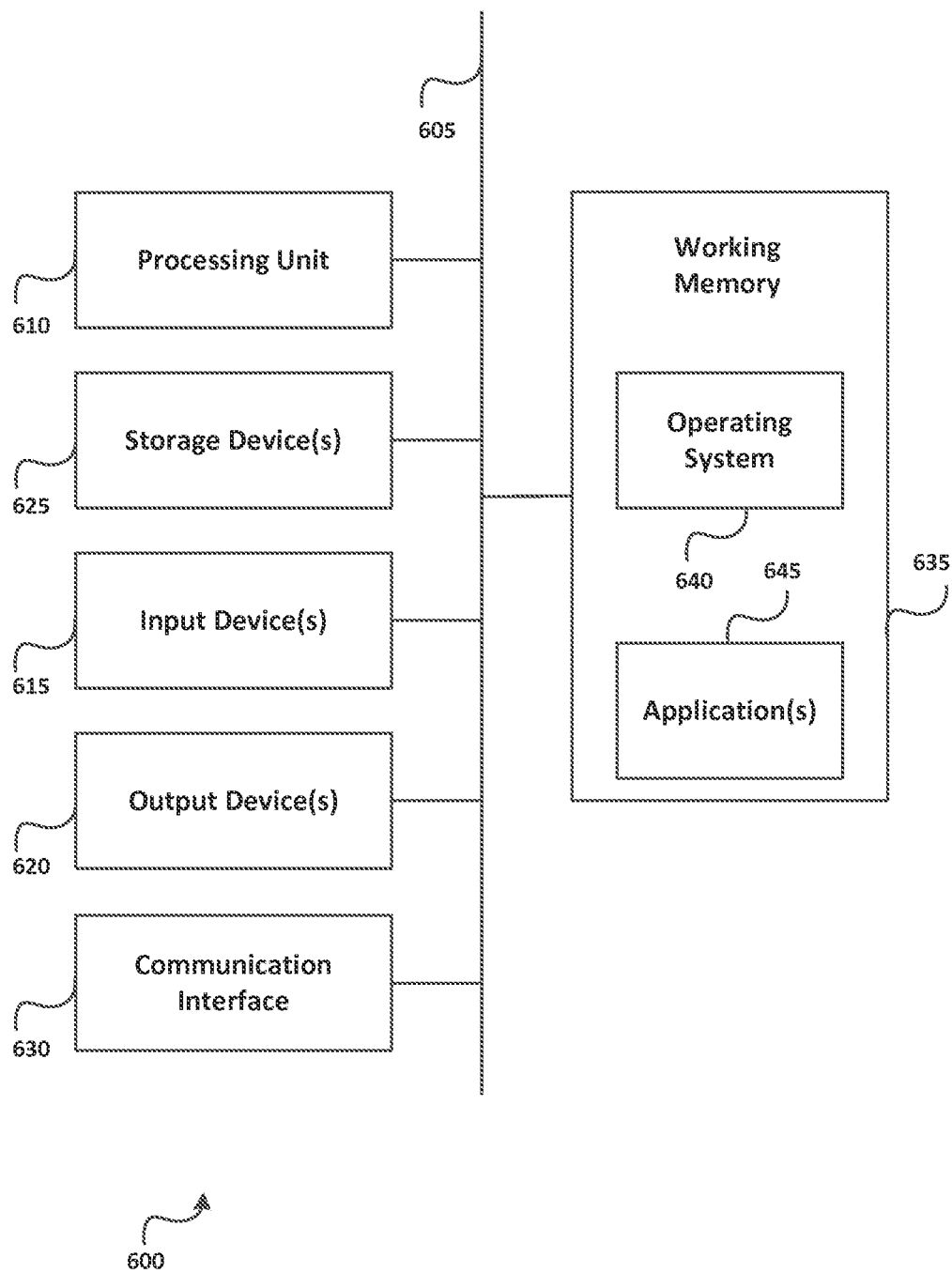
FIG. 6 depicts a computer system according to embodiments.

A computer system as illustrated in FIG. 6 may be incorporated as part of the previously described computerized devices. For example, computer system 600 can represent some of the components of the handheld transit fare devices 100, 200, 400, the NFC device 300, the external device 204, host computer 302 and 402, remote server 306 and 408, fare device 406, fare access media 404, and printer 410 described herein. FIG. 6 provides a schematic illustration of one embodiment of a computer system 600 that can perform the methods provided by various other embodiments, as described herein, and/or can function as the host computer system, a remote server, a portable NFC device, such as a handheld transit fare devices, a mobile device, and/or a computer system. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more general-purpose processors and/or one or more special-purpose processors (such as digital signal processing chips, graphics acceleration processors, and/or the like); one or more input devices 615, which can include without limitation a mouse, a keyboard, a touchscreen, receiver, a motion sensor, a camera, a smartcard reader, a contactless media reader, and/or the like; and one or more output devices 620, which can include without limitation a display device, a speaker, an LED, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, n handheld transit fare device configured to provide some or all of the features described herein relating to the journey inspection can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Embodiments of the invention have now been described in detail for the purposes of clarity and understanding. However, it will be appreciated that certain changes and modifications may be practiced within the scope of the appended claims.

What is claimed is:

1. A handheld transit fare device, the device comprising:
   a near field communication (NFC) interface configured to send and receive data;
   a memory; and
   a processor configured to:
      receive, via the NFC interface of the handheld transit fare device, a list of transactions from a host device, wherein the list of transactions comprises a plurality of identifiers of a plurality of fare access media used to gain access to a transit vehicle;
      store the list of transactions on the memory;
      provide a first indication that the list of transactions has been received;
      receive, via the NFC interface of the handheld transit fare device, an identifier from a fare access media on the transit vehicle;
      determine whether the identifier from the fare access media matches one of the plurality of identifiers from the list of transactions; and
      provide a second indication, the second indication providing a result of the determination.

2. The handheld transit fare device according to claim 1, wherein the processor is further configured to:
   communicate information to a second handheld transit fare device using the NFC interface, wherein the information comprises the result of the determination.

3. The handheld transit fare device according to claim 1, wherein the processor is further configured to:
   communicate information to the host device using the NFC interface, wherein the information comprises the result of the determination.

4. The handheld transit fare device according to claim 1, wherein:
   the fare access media comprises a limited number of uses, and wherein the method further comprises communicating a third indication that the fare access media was used to gain access to the transit vehicle to a central server using Wi-Fi or a cellular communication network.

5. The handheld transit fare device according to claim 1, wherein:
   the host device is located on a transit vehicle.

6. The handheld transit fare device according to claim 1, further comprising:
   a display or a speaker, wherein the first indication and the second indication comprise one or more of an audio indication or a visual indication.

7. The handheld transit fare device according to claim 1, wherein the processor is further configured to:

cause a receipt or citation to be printed based on the status of the determination.

8. A method for emulating a smartcard on a handheld transit fare device, the method comprising:
receiving, via a near field communication (NFC) interface of the handheld transit fare device, a list of transactions from a host device, wherein the list of transactions is communicated using standard smart card protocol commands and replies, the list of transactions comprising a plurality of identifiers of a plurality of fare access media used to gain access to a transit vehicle;
storing the list of transactions on a memory of the handheld transit fare device;
providing a first indication that the list of transactions has been received;
receiving, via the NFC interface of the handheld transit fare device, an identifier from a fare access media on the transit vehicle;
determining whether the identifier from the fare access media matches one of the plurality of identifiers from the list of transactions; and
providing a second indication, the second indication providing a result of the determination.

9. The method for emulating a smartcard on a handheld transit fare device according to claim 8, further comprising:
communicating information to a second handheld transit fare device using the NFC interface, wherein the information comprises the result of the determination.

10. The method for emulating a smartcard on a handheld transit fare device according to claim 8, further comprising:
communicating information to the host device using the NFC interface, wherein the information comprises the result of the determination.

11. The method for emulating a smartcard on a handheld transit fare device according to claim 8, wherein:
the host device is located on a transit vehicle.

12. The method for emulating a smartcard on a handheld transit fare device according to claim 8, wherein:
the first indication and the second indication comprise one or more of an audio indication or a visual indication.

13. The method for emulating a smartcard on a handheld transit fare device according to claim 8, further comprising:
causing a receipt or citation to be printed based on the result of the determination.

14. A non-transitory computer-readable medium having instructions embedded thereon for emulating a smartcard on a handheld transit fare device, the instructions comprising computer code for causing a computing device to:
receive, via a near field communication (NFC) interface of the handheld transit fare device, a list of transactions from a host device, wherein the list of transactions comprises a plurality of identifiers of a plurality of fare access media used to gain access to a transit vehicle;
store the list of transactions on a memory of the handheld transit fare device;
provide a first indication that the list of transactions has been received;
receive, via the NFC interface of the handheld transit fare device, an identifier from a fare access media on the transit vehicle;
determine whether the identifier from the fare access media matches one of the plurality of identifiers from the list of transactions; and
provide a second indication, the second indication providing a result of the determination.

15. The non-transitory computer-readable medium of claim 14, further comprising instructions for causing the computing device to:
communicate information to a second handheld transit fare device using the NFC interface, wherein the information comprises the result of the determination.

16. The non-transitory computer-readable medium of claim 14, further comprising instructions for causing the computing device to:
communicate information to the host device using the NFC interface, wherein the information comprises the result of the determination.

17. The non-transitory computer-readable medium of claim 14, wherein:
the fare access media comprises a limited number of uses, and wherein the non-transitory computer-readable medium further comprises instructions for causing the computing device to communicate a third indication that the fare access media was used to gain access to the transit vehicle to a central server using Wi-Fi or a cellular communication network.

18. The non-transitory computer-readable medium of claim 14, wherein:
the host device is located on a transit vehicle.

19. The non-transitory computer-readable medium of claim 14, wherein:
the first indication and the second indication comprise one or more of an audio indication or a visual indication.

* * * * *